United States Patent

Leone

Patent Number: 5,427,316
Date of Patent: Jun. 27, 1995

[54] MULTIPLE SUCKING-CHANNEL STRAW FOR SUCKING BEVERAGES

[76] Inventor: Marcello Leone, Via M. Celentano, 87, 70122 Bari, Italy

[21] Appl. No.: 248,250

[22] Filed: May 24, 1994

Related U.S. Application Data

[63] Continuation-in-part of Ser. No. 7,670,714, Mar. 18, 1991, abandoned, which is a continuation-in-part of Ser. No. 7,246,351, Sep. 19, 1988, abandoned.

[30] Foreign Application Priority Data

Jul. 7, 1988 [IT] Italy .................................. 21278/88

[51] Int. Cl.⁶ .............................................. A47G 21/18
[52] U.S. Cl. ....................................... 239/33; 239/450
[58] Field of Search ........................... 239/24, 33, 450

[56] References Cited

U.S. PATENT DOCUMENTS

| 585,057 | 6/1897 | Stone | 239/33 |
| 585,058 | 6/1897 | Stone | 239/33 |
| 1,223,933 | 4/1917 | Carr | 239/33 |
| 4,379,511 | 4/1983 | del Fabro | 239/33 X |
| 4,726,518 | 2/1988 | Martina et al. | 239/33 |

FOREIGN PATENT DOCUMENTS

| 320091 | 11/1913 | Germany | 239/33 |
| 2173686 | 10/1986 | United Kingdom | 239/33 |

*Primary Examiner*—William Grant
*Attorney, Agent, or Firm*—Bucknam and Archer

[57] ABSTRACT

A sucking straw has a substantially flat configuration and is provided with a plurality of adjoining beverage sucking channels. The straw fits the contour of the lips so that no air may go through when liquid is being sucked by the user. The amount of liquid being sucked is substantially greater than with conventional straws.

4 Claims, 1 Drawing Sheet

U.S. Patent June 27, 1995 5,427,316

MULTIPLE SUCKING-CHANNEL STRAW FOR SUCKING BEVERAGES

This application is a Continuation-in-Part of U.S. Ser. No. 07/670,714 filed Mar. 18, 1991, now abandoned, which was a Continuation-in-Part of U.S. Ser. No. 246,351 filed Sep. 19, 1988, now abandoned.

BACKGROUND OF THE INVENTION

It is well known that drinks and beverages in general, particularly if they are contained in bottles, cans and the like, can advantageously be sucked by means of a straw. It is also known that conventional sucking straws are made of a plastic material straw element, possibly provided with a bendable top portion. However, known straws are capable of sucking only a very small amount of beverage and the user, in order to meet his/her thirst requirements is compelled to suck the beverage with several quick sucking operations.

Some straws have been designed for providing a rather great flow rate: however these high flow rate straws involve for the manufacture the use of several cascade arranged machines as well as very complex and expensive finishing steps. Thus, these high flow rate straws have a comparatively high cost and have not been marketed to any substantial extent.

SUMMARY OF THE INVENTION

One object of the present invention is to provide a high flow-rate beverage sucking straw capable of facilitating the beverage sucking operation and increasing the amount of liquid being sucked.

Another object is to provide a straw which fits the contour of the lips and prevents air from being sucked in together with the beverage.

Still another object is to provide a straw which does not injure the lips of the user.

A further object is to provide a straw which can be manufactured easily and inexpensively.

Still another object is to provide a straw which has a large outer surface on which a variety of printed materials and colored patterns may be applied.

The straw, according to the present invention comprises an extruded body of plastic material having an elongated shape and having a plurality of adjoining, non-communicating channels within the body. The body of the straw has a continuous perimetrical line and is free of sharp corners which could injure the lips of the user. The body of the straw is made of two flat parallel opposite faces which provide a large surface for the application of a variety of patterns, figures and words. The inner channels are separated by a plurality of parallel longitudinal ribs while the outer channels are delimited by the side walls of the body in the straw.

BRIEF DESCRIPTION OF THE DRAWINGS

The invention is further illustrated by reference to the accompanying drawings of which.

DESCRIPTION OF THE PREFERRED EMBODIMENTS

Figure 1:
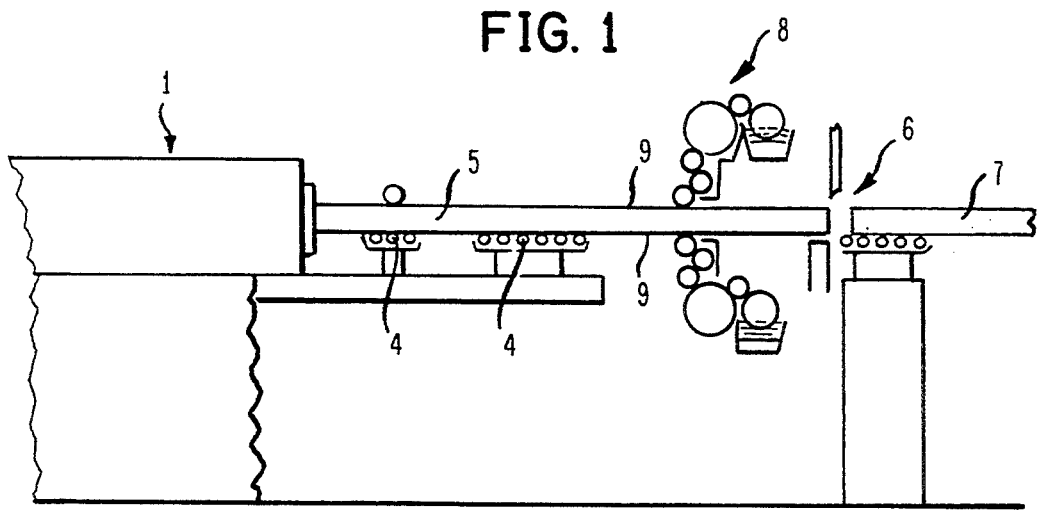
FIG. 1 schematically illustrates an apparatus for manufacturing the straw by extrusion which is associated with a straw cutting device and an optical straw printing device.

FIG. 1 shows the apparatus for making the beverage sucking straws according to the present invention. An extruding machine 1, on the extruding head of which there is mounted an extruding die is adapted to form a straw plastic material body including a plurality of adjoining small sucking channels 2, defining a perimetrical closed continuous line 3 in turn defining an elongated profile shape.

The extruding machine is supplied with a plastic material suitable for food packages which, depending on requirements, can be either transparent, translucid or colored.

Downstream of the extruding head there are provided roller conveyors 4 for slidingly displacing the extruded material or product 5, to cause said extruded material to suitably cool and stiffen.

Downstream of the mentioned roller conveyors there is arranged a cutting device 6 adapted to cut the extruded material in suitable lengths, corresponding to the desired lengths of the straws.

Upstream of the cutting device, a printing apparatus 8 may be advantageously arranged, of any conventional suitable type, including printing cylinders adapted to print on one or both faces 9 of the extruded material, wordings and/or patterns for advertising or decorative purposes.

The straws 7 have a flattened configuration and, accordingly, they comprise two substantially flat and large opposite printing faces so that visible patterns or advertising wordings can be printed thereon. The straws have a plurality of inner small channels 2, which are defined by parallel longitudinal ribs arranged perpendicularly to the two main faces of the straws, while the two small channels arranged at the ends of each straw are delimited by the corresponding side walls of the straw.

Figure 2:
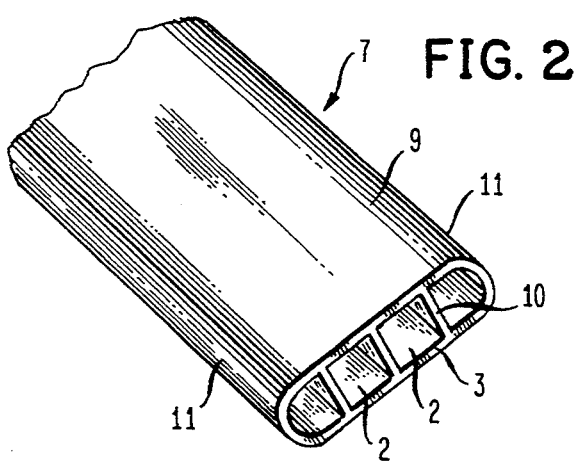
FIGS. 2, 3 and 4 illustrate different embodiments of the invention.
Figure 4:
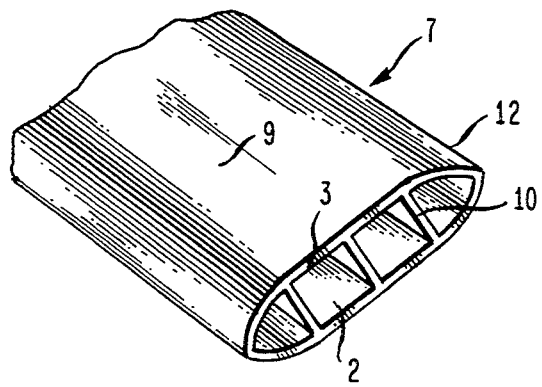

More specifically, in the straw illustrated in FIG. 2, the outermost small channels are defined by a substantially semicircular side wall 11, while in the straw shown in FIG. 4, the outermost small channels have a triangular shape 12.

Figure 3:
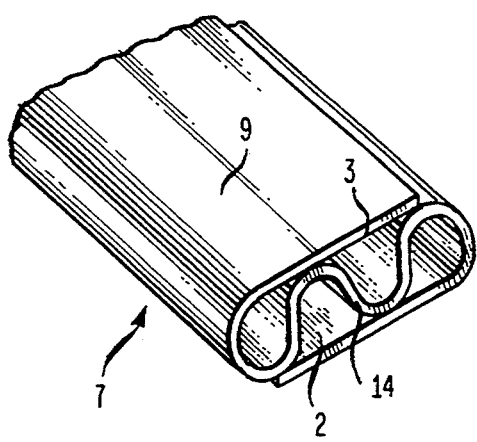

FIG. 3 shows a straw in which the small channels 2 are defined by a wavy rib 14 which is tangent to the main surfaces of said straw.

In each embodiment, the profile or contour of the straw is designed to fit the lip contour so as to prevent air from being sucked in together with the beverage.

In particular, the above mentioned longitudinal inner ribs 10, are made with a thickness adapted to provide the ribs with a double practical function. More specifically, the ribs have a strength sufficient to resist the pressure of the printing operation, on one or both faces of the straw and at the same time, they are sufficiently flexible to allow the straw profile to perfectly mate with the lips of the user.

Tests have shown that the amount of liquid being sucked by the user with the straws, according to the present invention is substantially greater than with conventional straws.

Obviously the size of the straw may be varied and only three inner channels may be provided for use by small children while the straw may have five or six inner channels for adults.

What is claimed is:

1. A sucking straw comprising:

an extruded plastic material straw body having an exterior defining a perimetrical closed continuous line cross-sectional shape, said cross-sectional shape having a constant length and width throughout the extent of said straw body;

said straw body further including a plurality of adjoining, non-communicating inner channels within said body, two outer end channels delimited by corresponding side walls of said straw body, and two substantially flat, parallel opposite faces for providing broad printing areas;

the perimetrical closed continuous line cross-sectional shape of the straw body being free of sharp edges and fitting the contour of the lips of a user in use during a liquid sucking operation, whereby no air passage is created between the exterior of the straw body and the lips of the user.

2. The straw according to claim 1, wherein said end channels have a substantially semicircular cross-section and the inner channels are defined by parallel longitudinal ribs.

3. The straw according to claim 1, wherein said end channels have a triangular shape with an acute angle cross-section face and the inner channels are defined by parallel longitudinal ribs.

4. The straw according to claim 1, wherein said inner rand outer channels are defined by a wavy rib tangent to said two substantially flat opposite faces of said straw.

* * * * *